US007285192B2

(12) United States Patent
Brand et al.

(10) Patent No.: US 7,285,192 B2
(45) Date of Patent: Oct. 23, 2007

(54) PRESSURE ELECTROLYZER AND METHOD FOR SWITCHING OFF A PRESSURE ELECTROLYZER

(75) Inventors: Rolf A Brand, Bruckmuhl (DE); Oddmund Wallevik, Skien (NO)

(73) Assignee: GHW Gesellschaft für Hochleistungselektrolyseure zur Wasserstofferzeugung mbH, Strasslach (DE)

( * ) Notice: Subject to any disclaimer, the term of this patent is extended or adjusted under 35 U.S.C. 154(b) by 374 days.

(21) Appl. No.: 10/538,027

(22) PCT Filed: Dec. 10, 2003

(86) PCT No.: PCT/EP03/13993

§ 371 (c)(1),
(2), (4) Date: Jun. 8, 2005

(87) PCT Pub. No.: WO2004/055242

PCT Pub. Date: Jul. 1, 2004

(65) Prior Publication Data

US 2006/0049039 A1    Mar. 9, 2006

(30) Foreign Application Priority Data

Dec. 14, 2002    (DE) ................... 102 58 525

(51) Int. Cl.
*C25B 9/08* (2006.01)
(52) U.S. Cl. .............. 204/258; 204/257; 204/266; 205/628
(58) Field of Classification Search ........ 204/258, 204/257, 266; 205/628
See application file for complete search history.

(56) References Cited

U.S. PATENT DOCUMENTS

| | | | | |
|---|---|---|---|---|
| 3,652,431 A | * | 3/1972 | Reynolds | 205/338 |
| 4,077,863 A | | 3/1978 | Nasser | |
| 5,690,797 A | * | 11/1997 | Harada et al. | 204/228.5 |
| 5,783,051 A | * | 7/1998 | Hirai et al. | 204/254 |
| 7,048,839 B2 | * | 5/2006 | Harada | 204/266 |
| 2003/0141200 A1 | * | 7/2003 | Harada | 205/637 |

FOREIGN PATENT DOCUMENTS

| | | | |
|---|---|---|---|
| DE | 25 48 699 C3 | | 5/1977 |
| DE | 36 03 244 A1 | | 8/1987 |
| DE | 38 37 354 A1 | | 5/1990 |
| DE | 199 01 884 A1 | | 7/2000 |
| DE | 19901884 | * | 7/2000 |
| WO | WO 03/033768 A2 | | 4/2003 |

* cited by examiner

*Primary Examiner*—Bruce F. Bell
(74) *Attorney, Agent, or Firm*—Klaus P. Stoffel; Wolff & Samson

(57) ABSTRACT

A pressure electrolyzer having a pressure reservoir, an electrolytic cell block containing a number of electrolytic cells and positioned in the pressure reservoir, the electrolytic cells each containing anodes and cathodes, and an electrolyte circulatory system for supplying electrolyte to the anodes and cathodes. The circulatory system includes an oxygen separator operative to separate gaseous oxygen formed during operation of the pressure electrolyzer and a hydrogen separator operative to separate gaseous hydrogen formed during operation of the pressure electrolyzer, and a store of an inert gas, to inert the pressure electrolyzer when it is switched off. The store of inert gas is supplied to the oxygen separator. The electrolyte circulatory system further includes a connecting line arranged so that a part of the electrolyte can be pushed out of the hydrogen separator when the inert gas is applied to the oxygen separator so as to displace the gaseous hydrogen.

12 Claims, 4 Drawing Sheets

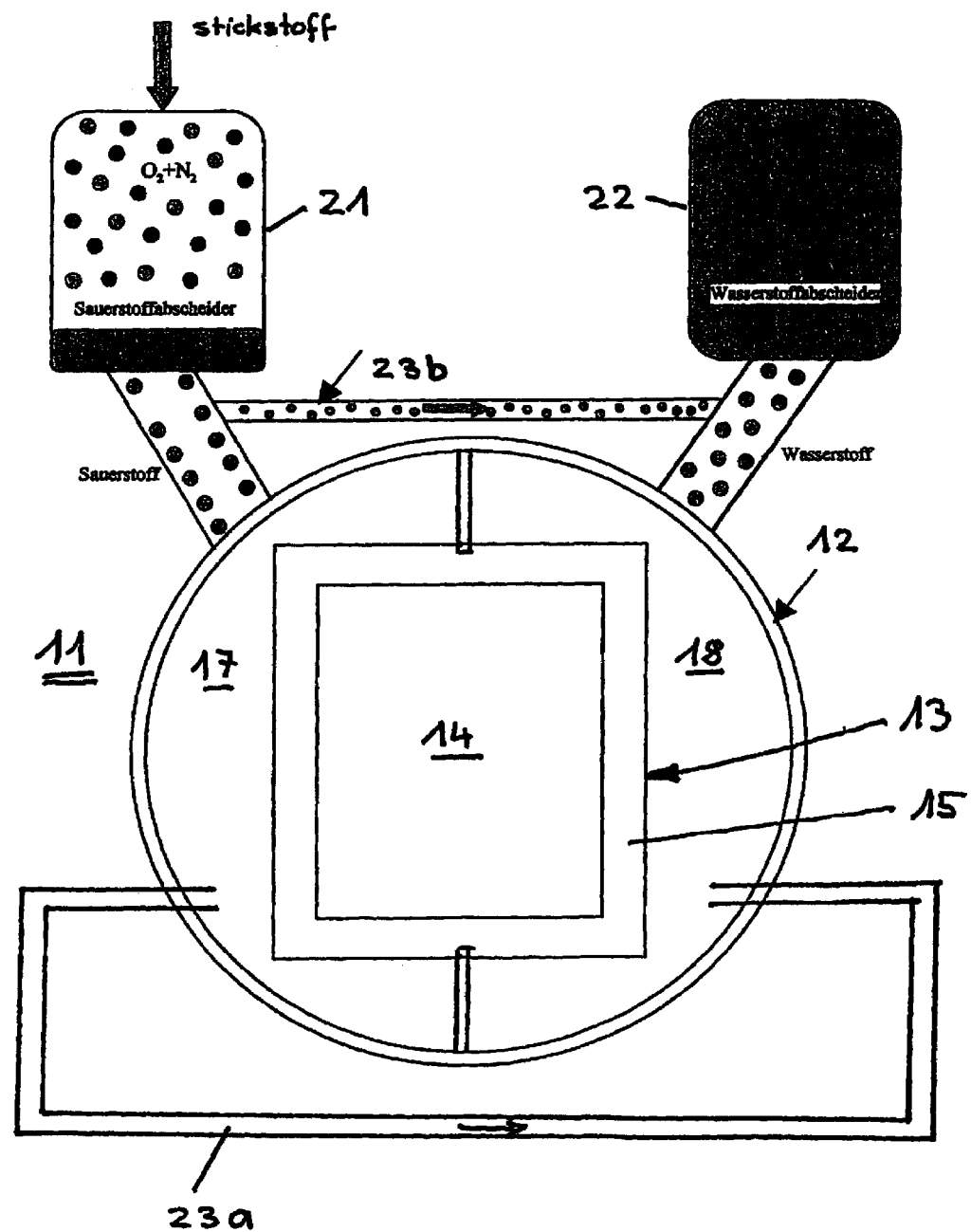

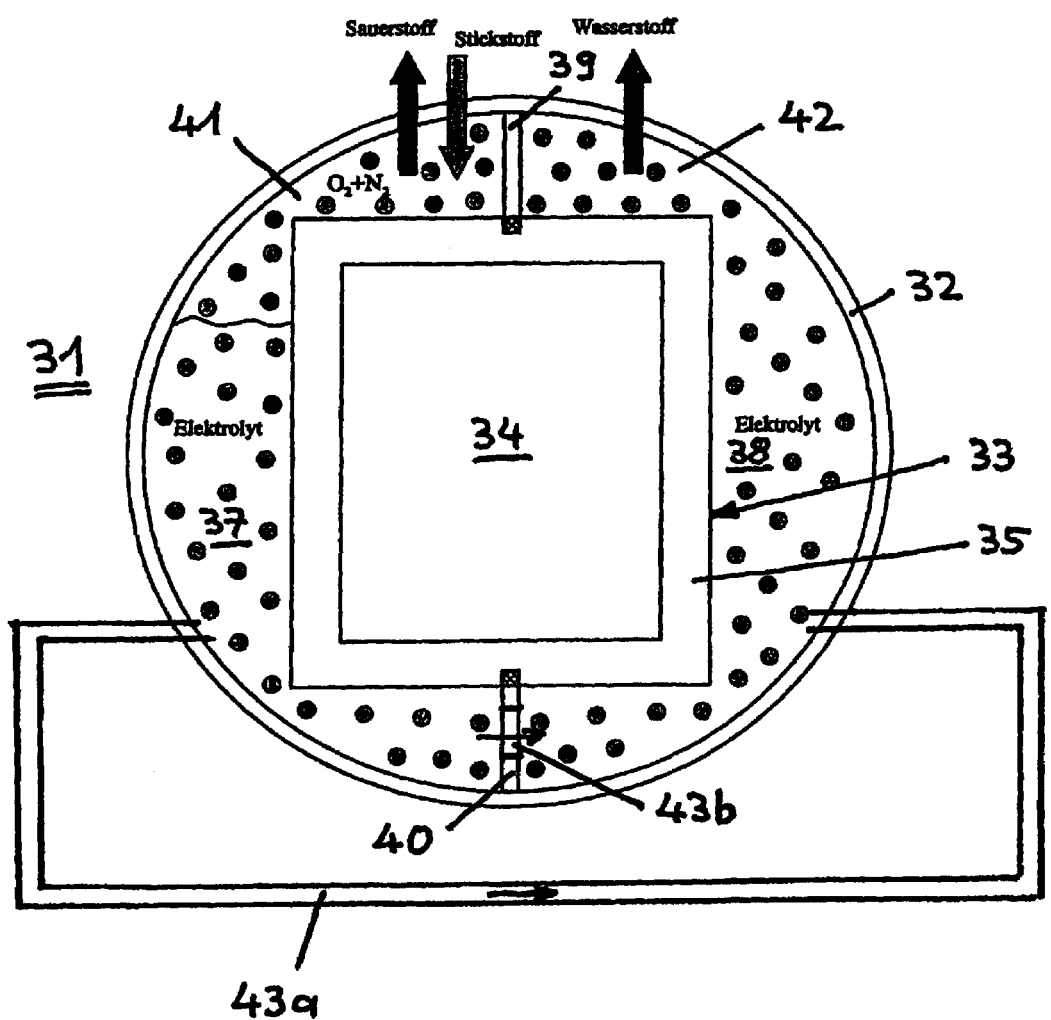

PRESSURE ELECTROLYZER AND METHOD FOR SWITCHING OFF A PRESSURE ELECTROLYZER

PRIORITY CLAIM

This is a 35 U.S.C. §371 National Stage of International Application No. PCT/EP2003/013993, filed on Dec. 10, 2003. Priority is claimed on that application and on the following application:
Country: Germany, Application No. 102 58 525.3, Filed: Dec. 14, 2002.

BACKGROUND OF THE INVENTION

The invention relates to a pressure electrolyser, and a process for switching off a pressure electrolyser.

Pressure electrolysers which comprise a pressure reservoir and an electrolytic cell block which is positioned in the pressure reservoir and contains a number of electrolytic cells combined in the form of a stack are known for the electrolytic splitting of water into hydrogen and oxygen. The electrolytic cells contain anodes and cathodes, and an electrolyte circulatory system is provided for supplying electrolyte to the anodes and cathodes. An oxygen separator serves to separate the gaseous oxygen formed during the operation of the pressure electrolyser and a hydrogen separator serves to separate the gaseous hydrogen formed during the operation of the pressure electrolyser. In order to inert the pressure electrolyser when it is switched off a store of an inert gas, in particular nitrogen, is provided.

A pressure electrolyser of traditional type is known from DE 25 48 699 C3, for example.

A vital safety factor in pressure electrolysers of the type specified lies in their capacity to be inerted quickly, reliably and fully, i.e. in the removal of the hydrogen from the pressure reservoir and from the hydrogen separator, such that the residual hydrogen content is well below the lower explosion limit of 4% by vol.

Traditionally, large quantities of inert gas, typically nitrogen, are held ready for inerting, it being used to rinse the hydrogen out of the hydrogen separator when the electrolyser is switched off, in the event of an emergency shutdown, for example. To this end the pressure in the pressure electrolyser may either be maintained or reduced to ambient pressure in the course of rinsing with the inert gas. In any event, due to the mixing of the gases a, multiple of the gas volume of the hydrogen separator must be held ready in the form of inert gas. Since, due to the evolution of hydrogen or oxygen in hidden caverns, decompressing the electrolyser at speed typically causes damage to the seals and structural components of the cells and means that the subsequent restarting of the unpressurised plant is associated with considerable energy expenditure, the electrolyser should, where possible, only be decompressed in three, genuinely unavoidable emergency scenarios: an electrolyte leak, a product gas leak or a critical impurity in the product gas. In all other cases pressure should be maintained when the electrolyser is switched off.

SUMMARY OF THE INVENTION

The object of the invention is to create a pressure electrolyser and a process for switching off a pressure electrolyser in which the reliable inerting of the electrolyser is possible with a minimum amount of inert gas. In particular, but not exclusively, it should be possible to switch off the electrolyser without decompressing it.

The invention creates a pressure electrolyser with a pressure reservoir and an electrolytic cell block which is positioned in the pressure reservoir and contains a number of electrolytic cells. The electrolytic cells contain anodes and cathodes and an electrolyte circulatory system is provided for supplying electrolyte to the anodes and cathodes. An oxygen separator is provided to separate the gaseous oxygen formed during the operation of the pressure electrolyser and a hydrogen separator is provided to separate the gaseous hydrogen formed during the operation of the pressure electrolyser. A store of an inert gas, in particular nitrogen, serves to inert the pressure electrolyser when it is switched off. In the invention the store of inert gas can be supplied to the oxygen separator and the electrolyte circulatory system contains a connecting line via which a part of the electrolyte can be pushed out of the hydrogen separator when the inert gas is applied to the oxygen separator, thereby displacing the gaseous hydrogen.

In one version of the pressure electrolyser disclosed in the invention, the oxygen separator and/or the hydrogen separator is provided outside the pressure reservoir and when the inert gas is applied to the oxygen separator a part of the electrolyte can be pushed from the pressure reservoir and/or the oxygen separator into the hydrogen separator in order to displace the hydrogen in the hydrogen separator.

In another preferred version of the invention the oxygen separator and/or the hydrogen separator is formed by a part of the volume within the pressure reservoir and when the inert gas is applied to the oxygen separator a part of the electrolyte can be pushed into the part of the pressure reservoir which forms the hydrogen separator in order to displace the hydrogen, in particular within the pressure reservoir.

In one version of the invention the connecting line via which a part of the electrolyte can be pushed out of the hydrogen separator by displacing the hydrogen is provided outside the pressure reservoir.

In this arrangement, the connecting line may take the form of a shuttle line which runs beneath the liquid level of the electrolyte and connects the oxygen separator to the hydrogen separator.

In an alternative version of the pressure electrolyser disclosed in the invention the connecting line via which a part of the electrolyte can be pushed out of the hydrogen separator, thereby displacing the hydrogen, is provided inside the pressure reservoir.

In an advantageous version of the pressure electrolyser disclosed in the invention, the housing of the electrolytic cell block and the pressure reservoir together form at least two separate chambers which are part of the electrolyte circulatory system and which are delimited from the electrolytic cells by the housing and from the environment by the pressure reservoir, one of the separate chambers being part of an anolyte circuit and connected to the oxygen separator and another of the separate chambers being part of a catholyte circuit and connected to the hydrogen separator.

In this arrangement, the separate chambers can be separated by dividing walls which extend from the housing of the electrolytic cell block and the pressure reservoir and the connecting line, via which a part of the electrolyte can be pushed out of the hydrogen separator, thereby displacing the hydrogen, can be formed by a passage in an area of the dividing walls which lies below the liquid level of the electrolyte.

Furthermore, the invention also creates a process for switching off a pressure electrolyser, the pressure electrolyser containing a pressure reservoir and an electrolytic cell block which comprises a number of electrolytic cells and is positioned in the pressure reservoir, the electrolytic cells containing anodes and cathodes and an electrolyte circulatory system being provided for the supply of electrolyte to the anodes and cathodes. An oxygen separator serves to separate the gaseous oxygen formed during the operation of the pressure electrolyser and a hydrogen separator serves to separate the gaseous hydrogen formed during the operation of the pressure electrolyser. To inert the pressure electrolyser, an inert gas, in particular nitrogen, is fed into the pressure electrolyser when it is switched off. In the invention, the inert gas is fed into the oxygen separator and when the inert gas is applied to the oxygen separator a part of the electrolyte is pushed out of the hydrogen separator via a connecting line provided in the electrolyte circulator system, thereby displacing the gaseous hydrogen.

In an advantageous version of the process disclosed in the invention the oxygen separator and/or the hydrogen separator is provided outside the pressure reservoir and when the inert gas is applied to the oxygen separator a part of the electrolyte is pushed from the pressure reservoir and/or from the oxygen separator into the hydrogen separator in order to displace the hydrogen in the hydrogen separator.

In another advantageous version of the process disclosed in the invention the oxygen separator and/or the hydrogen separator is formed by a part of the volume inside the pressure reservoir and when the inert gas is applied to the oxygen separator a part of the electrolyte is pushed into the part of the pressure reservoir volume forming the hydrogen separator in order to displace the hydrogen, in particular inside the pressure reservoir.

Various embodiments of the invention are explained below with reference to the drawings.

DETAILED DESCRIPTION OF THE INVENTION

Figure 1A:
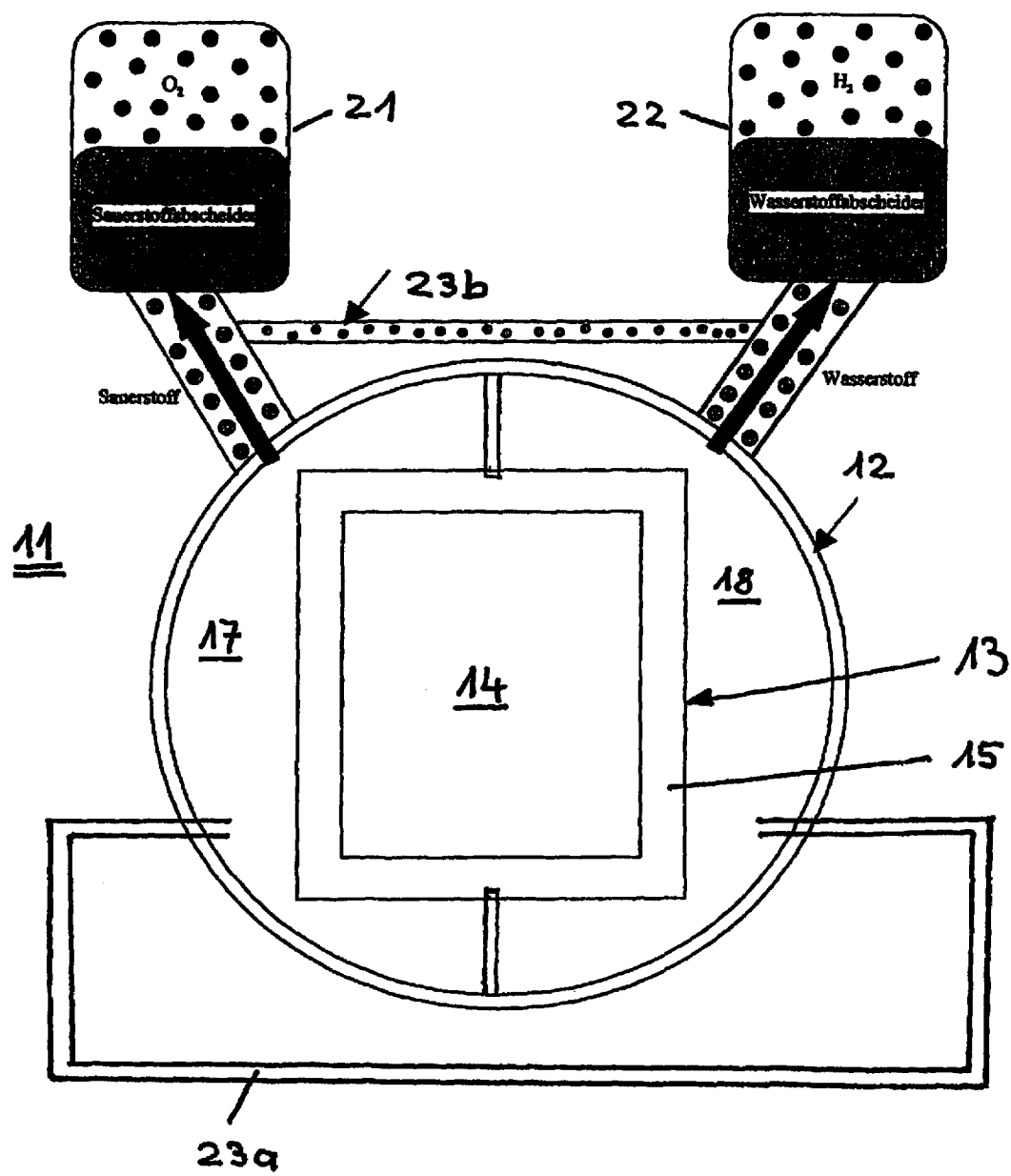
FIGS. 1a) and 1b) show a schematic view of a pressure electrolyser as disclosed in the invention in an operating mode (FIG. 1a) and in a switched-off mode (FIG. 1b).

In FIGS. 1a), 1b), 2a) and 2b) a pressure electrolyser referred to in its totality by the reference numerals (11/31) and used for the electrolytic splitting of water into hydrogen and oxygen comprises a pressure reservoir (12/32) in which is positioned an electrolytic cell block (13/33). The electrolytic cell block (13/33) consists of a number of electrolytic cells (14/34) combined in the form of a stack which are indicated only generally in the drawings. The electrolytic cells (14) each contain an anode and a cathode (not illustrated). An electrolyte circulatory system (of which only part is illustrated in the drawings) serves to supply electrolyte to the anodes and cathodes. An electrolyser of this type is described in the unpublished German patent application with the reference no. 101 50 557.4, for example.

In addition to the pressure reservoir (12), the embodiment illustrated in FIGS. 1a) and 1b) also contains an oxygen separator (21) for separating the gaseous oxygen formed when the pressure electrolyser (11) is in operation and a hydrogen separator (22) for separating the gaseous hydrogen formed when the pressure electrolyser (11) is in operation.

Figure 2A:
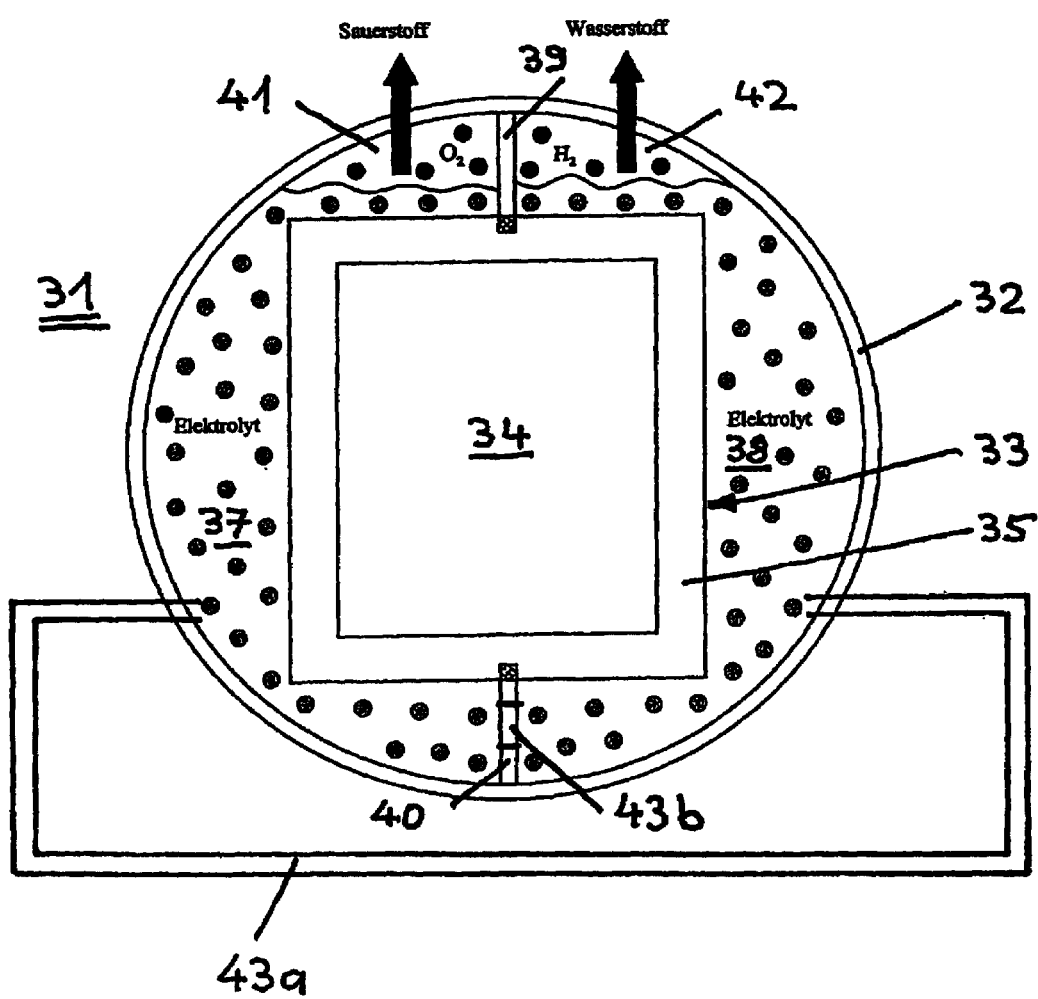
FIGS. 2a) and 2b) show a schematic view of a pressure electrolyser as disclosed in the invention in an operating mode (FIG. 2a) and in a switched-off mode (FIG. 2b).

In the embodiment illustrated in FIGS. 2a) and 2b), the housing (35) of the electrolytic cell block (33) together with the pressure reservoir (32) forms two separate chambers (37, 38) which are separated from one another by dividing walls (39, 40) which extend between the housing (35) of the electrolytic cell block (33) and the pressure reservoir (32). The two separate chambers (37, 38) form part of the electrolyte circulatory system and are delimited from the electrolytic cells (34) by the housing (35) and from the environment by the pressure reservoir (32).

A part of the volume inside the pressure reservoir (32) which is located above the electrolytic cell block (33) forms an oxygen separator (41) for separating the gaseous oxygen formed during the operation of the pressure electrolyser (31) and a part of the volume inside the pressure reservoir (32) which is also located above the electrolytic cell block (33) forms a hydrogen separator (42) for separating the gaseous hydrogen formed during the operation of the pressure electrolyser (31).

Of the two aforementioned separate chambers (37, 38) which form part of the electrolyte circulatory system, one, namely chamber (37), is part of an anolyte circuit and is connected to the part of the volume inside the pressure reservoir (32) which forms the oxygen separator (41), while the other chamber (38) is part of a catholyte circuit and is connected to the part of the volume inside the pressure reservoir (32) which forms the hydrogen separator (42).

In all the embodiments illustrated a store of an inert gas, in particular nitrogen, is provided for inerting the pressure electrolyser (11/31) when it is switched off. This store is not, however, illustrated in the drawings. This inert gas serves to rid the pressure electrolyser, and in particular the hydrogen separator (22/42), of hydrogen at least to the extent that the hydrogen content lies below the lower explosion limit of 4% by vol. In general terms, this store of inert gas or the inert gas held ready can be fed into the oxygen separator (21/41) in such a manner that when the inert gas is applied to the oxygen separator (21/41) a part of the electrolyte within the electrolyte circuit is pushed in such a manner that the gaseous hydrogen is forced out of the hydrogen separator (22/42). In this arrangement, the displaced hydrogen may be discharged into the environment, stored or removed in another manner, for example.

In order that the electrolyte in the electrolyte circulatory system can be pushed out of the hydrogen separator (22/42) as described above, thereby displacing the gaseous hydrogen, a connecting line (23a; 23b; 42a; 43b) is provided in the electrolyte circulatory system which may be of various designs.

In the embodiment illustrated in FIGS. 1a) and 1b) the aforementioned connecting line is provided outside the pressure reservoir (12), two different versions thereof being illustrated in the same diagram. For example, the connecting line running outside the pressure reservoir (12) may be formed either by a connecting line (23a) which connects a volume area associated with the oxygen separator (21) inside the pressure reservoir (12) to a volume area associated with the hydrogen separator (22) inside the pressure reservoir (12), or by a shuttle line (23b) which connects the oxygen separator (21) to the hydrogen separator (22) and runs beneath the liquid level of the electrolyte. Finally, the aforementioned connecting line may also connect an area 17 of the electrolyte circuit associated with the oxygen separator (21) to an area 18 of the electrolyte circuit associated with the hydrogen separator (22) inside the pressure reservoir (12) (although this version is not illustrated in FIGS. 1a) and 1b)).

In the normal operating mode of the pressure electrolyser (11) illustrated in FIG. 1a), any oxygen formed is collected in the oxygen separator (21) and any hydrogen formed is collected in the hydrogen separator (22). Parts (namely the bottom) of both the oxygen separator (21) and the hydrogen separator (22) are filled with electrolyte, while the product gas in question collects in the upper area of the separator (21, 22).

When the pressure electrolyser (11) needs to be switched off, the inert gas held ready, typically nitrogen, is fed into the oxygen separator (21), typically in the upper volume area provided for the collection of the gaseous oxygen. Part of the electrolyte is then pushed via the connecting line (23a, 23b) provided in the electrolyte circuit out of the oxygen separator (21) and/or out of the pressure reservoir (12) into the hydrogen separator (22) where it displaces the gaseous hydrogen in said hydrogen separator (22), thereby inerting the pressure electrolyser (11) and the hydrogen separator (22). This inerting process does not usefully take place until essentially all the gaseous hydrogen has risen out of the pressure reservoir (12) into the hydrogen separator (22), FIG. 1b) shows the pressure electrolyser (11) in its switched-off, inerted state.

In the embodiment illustrated in FIGS. 2a) and 2b) the connecting line (43a, 43b) via which a part of the electrolyte can be pushed out of the volume area of the pressure reservoir (32) forming the hydrogen separator (42), thereby displacing the gaseous hydrogen, is either formed by a connecting line (43a) running outside the pressure reservoir (32) which connects a chamber (37) forming the volume area of the pressure reservoir (32) associated with the oxygen separator (41), i.e. one part of the anolyte circuit, to a chamber (38) forming the volume area of the pressure reservoir (32) associated with the hydrogen separator (42), i.e. one part of the catholyte circuit, or there is provided inside the pressure reservoir (32) a connecting line (43b) which connects a chamber (37) forming the volume area of the pressure reservoir (32) associated with the oxygen separator (41), i.e. one part of the anolyte circuit, to a chamber (38) forming the volume area of the pressure reservoir (32) associated with the hydrogen separator (42), i.e. one part of the catholyte circuit. This connecting line (43b) is typically provided in the dividing wall (40) beneath the electrolytic cell block (33).

When inerting the electrolyser (31), the inert gas held ready, typically nitrogen, is applied to volume area of the pressure reservoir (32) forming the oxygen separator (41), thereby transferring the electrolyte via the connecting line (43a/43b) out of the volume area of the pressure reservoir (32) associated with the oxygen separator (41), i.e. out of the chamber (37) of the anolyte circuit, into the volume area of the pressure reservoir (32) associated with the hydrogen separator (42), i.e. into the chamber (38) of the catholyte circuit, until the hydrogen has been completely removed from the volume area of the pressure reservoir (32) forming the hydrogen separator (42). Here, once again, inerting does not usefully take place until essentially all the hydrogen formed has collected in the hydrogen separator (42), i.e. in the corresponding volume area of the pressure reservoir (32).

In all the embodiments detailed, the pushing of the electrolyte level into the hydrogen separator (22/42) can be monitored by appropriate means, for example by level detectors which monitor the rise in level of the electrolyte in the hydrogen separator (22/42) up to a predetermined level.

The hydrogen displaced during the inerting of the hydrogen separator (22/42) can be stored and used again. It must not be disposed of since it is not mixed with the inert gas fed in.

The invention may be used with all types of electrolysers including, for example, PEM electrolysers which use water as the electrolyte.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

The invention claimed is:

1. A pressure electrolyser, comprising: a pressure reservoir; an electrolytic cell block containing a number of electrolytic cells and positioned in the pressure reservoir, the electrolytic cells each containing anodes and cathodes; and an electrolyte circulatory system for supplying electrolyte to the anodes and cathodes, the circulatory system including an oxygen separator operative to separate gaseous oxygen formed during operation of the pressure electrolyser and a hydrogen separator operative to separate gaseous hydrogen formed during operation of the pressure electrolyser, and a store of an inert gas to inert the pressure electrolyser when it is switched off, the store of inert gas being supplyable to the oxygen separator, the electrolyte circulatory system further including a connecting line arranged so that a part of the electrolyte can be pushed out of the hydrogen separator when the inert gas is applied to the oxygen separator so as to displace the gaseous hydrogen.

2. A pressure electrolyser in accordance with claim 1, wherein the oxygen separator and/or the hydrogen separator is arranged outside the pressure reservoir so that when the inert gas is applied to the oxygen separator a part of the electrolyte is pushed by the pressure reservoir and/or by the oxygen separator into the hydrogen separator in order to displace the hydrogen in the hydrogen separator.

3. A pressure electrolyser in accordance with claim 1, wherein the oxygen separator and/or the hydrogen separator is formed by a part of the volume inside the pressure reservoir so that when the inert gas is applied to the oxygen separator, a part of the electrolyte is pushed into the part of the pressure reservoir volume forming the hydrogen separator in order to displace the hydrogen.

4. A pressure electrolyser in accordance with claim 1, wherein the connecting line is arranged outside the pressure reservoir.

5. A pressure electrolyser in accordance with claim 2, wherein the connecting line is arranged outside the pressure reservoir, the connecting line being formed by a shuttle line that runs beneath the liquid level of the electrolyte and connects the oxygen separator to the hydrogen separator.

6. A pressure electrolyser in accordance with claim 1, wherein the connecting line is provided inside the pressure reservoir.

7. A pressure electrolyser in accordance with claim 1, wherein the electrolytic cell block has a housing that together with the pressure reservoir forms at least two separate chambers which are part of the electrolyte circulatory system and which are delimited from the electrolytic cells by the housing and from the environment by the pressure reservoir, one of the separate chambers being part of an anolyte circuit and connected to the oxygen separator and another of the separate chambers being part of a catholyte circuit and connected to the hydrogen separator.

8. A pressure electrolyser in accordance with claim 7, wherein the separate chambers are separated from one another by dividing walls which extend between the housing of the electrolytic cell block and the pressure reservoir, the connecting line being formed by a passage in an area of the dividing walls beneath the liquid level of the electrolyte.

9. A process for switching off a pressure electrolyser which comprises a pressure reservoir and an electrolytic cell block containing a number of electrolytic cells and positioned in the pressure reservoir, the electrolytic cells each containing anodes and cathodes and an electrolyte circulatory system for supplying electrolyte to the anodes and cathodes, an oxygen separator to separate gaseous oxygen formed during operation of the pressure electrolyser and a hydrogen separator to separate gaseous hydrogen formed during operation of the pressure electrolyser being provided, an inert gas, the process comprising the steps of: switching off the pressure electrolyser; and feeding inert gas to the oxygen separator so that a part of the electrolyte is pushed out of the hydrogen separator via a connecting line contained in the electrolyte circulatory system, thereby displacing the gaseous hydrogen.

10. A process in accordance with claim 9, wherein the oxygen separator and/or the hydrogen separator is provided outside the pressure reservoir, and when the inert gas is applied to the oxygen separator, pushing a part of the electrolyte is pushed by the pressure reservoir and/or the oxygen separator into the hydrogen separator in order to displace the hydrogen in the hydrogen separator.

11. A process in accordance with claim 9, wherein the oxygen separator and/or the hydrogen separator is formed by a part of the volume inside the pressure reservoir, and when the inert gas is applied to the oxygen separator, pushing a part of the electrolyte is pushed into the pressure reservoir volume forming the hydrogen separator in order to displace the hydrogen.

12. A process in accordance with claim 9, wherein the inert gas is nitrogen.

* * * * *